United States Patent [19]

Esser

[11] 4,378,466
[45] Mar. 29, 1983

[54] CONVERSION OF ACOUSTIC SIGNALS INTO VISUAL SIGNALS

[75] Inventor: Günter Esser, Ratingen, Fed. Rep. of Germany

[73] Assignee: Robert Bosch GmbH, Stuttgart, Fed. Rep. of Germany

[21] Appl. No.: 82,911

[22] Filed: Oct. 4, 1979

[30] Foreign Application Priority Data

Oct. 4, 1978 [DE] Fed. Rep. of Germany ....... 2843180

[51] Int. Cl.³ .............................................. G10L 1/12
[52] U.S. Cl. ................... 179/1 SP; 358/81; 84/464 R
[58] Field of Search ............. 179/1 SP, 1 SA; 84/464; 358/81, 82

[56] References Cited

U.S. PATENT DOCUMENTS

| | | | |
|---|---|---|---|
| 2,131,934 | 10/1938 | Burchfield | 84/464 |
| 3,240,099 | 3/1966 | Irons | 84/464 |
| 3,581,192 | 5/1971 | Miura | 179/1 SP |
| 3,604,852 | 9/1971 | Weintraub | 84/464 |
| 3,623,392 | 11/1971 | Bayer | 84/464 |
| 3,639,691 | 2/1972 | Beninghof | 179/1 SP |
| 3,723,652 | 3/1973 | Alles et al. | 179/1 SP |
| 3,969,972 | 7/1976 | Bryant | 358/81 |
| 4,142,067 | 2/1979 | Williamson | 179/1 SP |

Primary Examiner—Emanuel S. Kemeny
Attorney, Agent, or Firm—Spencer & Kaye

[57] ABSTRACT

For displaying spoken words as color pictures on a screen, each audio frequency, i.e. each acoustic sound, is assigned a respective color hue and each audio frequency spectrum a respective color mixture, by conducting acoustic signals through a three-channel triangular filter, each channel having a different central frequency, and controlling the intensity of a respective electron beam of a color television monitor as a function of a respective filter channel output.

6 Claims, 2 Drawing Figures

CONVERSION OF ACOUSTIC SIGNALS INTO VISUAL SIGNALS

BACKGROUND OF THE INVENTION

The present invention relates to the conversion of acoustic signals, particularly audio signals, into visible information, according to a procedure in which the acoustic signals are divided in parallel connected filters and made visible on the screen of a cathode ray tube, and the brightness of the cathode beam in the tube is controlled in dependence on the intensity of the signals produced by the individual filters.

Many attempts have been made to overcome the lack of hearing capability of hearing impaired and deaf persons by converting acoustic signals, in particular audio signals, into a different form. Methods used in this connection include frequency transformation, vibration transmission to the skin, and optical conversions according to various "visible speech" methods.

For frequency transformation, the audio signals are transposed one or two octaves down because for most hearing impaired persons the hearing losses in the lower frequency ranges are not as severe as in the high audio frequency range.

However, this method, similar to vibration transmission to the skin, has not found great acceptance because the number of information elements that can be transferred per second is too low.

In a known "visible speech" method, described in the text "Einführung in die Akustik" [Introduction to Acoustics] by Ferdinand Tredelenburg, 3rd revised edition, published by Springer-Verlag, Berlin, 1961, at pages 491, 492, sound spectrograms are displayed on the luminescent screen of a specially designed Braun tube. This tube is provided with a cylindrical luminescent screen which rotates past the observer about a vertical axis and on which impinges a cathode-ray coming from the middle of the cylinder. Alongside the vertical axis there is provided a frequency scale. The instaneous outputs from twelve filters divided by octaves are tapped in succession by a rotating switch. The brightness of the cathode beam moving over the vertical axis changes in accordance with the intensity of the outputs of the individual filters so that a sound spectrum is developed along this axis.

As the screen coated with a phosphorescent material rotates past the observer, he sees very clearly the intensity distribution of the sound pattern in question in the various regions of the spectrum and its variation in time. Time is plotted in the X, or circumferential, direction and frequency in the Y, or axial, direction, the degree of darkening of the screen indicating amplitude.

This type of signal conversion has gained great significance for voice recognition, for example, in criminal cases, but the information contained in the images can be evaluated only with the aid of very fine analysis methods so that such conversion has not found acceptance as a means of communication.

SUMMARY OF THE INVENTION

It is an object of the present invention to improve the information transmission capability of such visible speech procedures.

This and other objects are achieved according to the present invention, in a method and apparatus of the type described initially herein, by assigning different color hues to different audio frequency values and a precisely defined color mixture to each acoustic spectral pattern.

The present invention offers the advantage that the acoustic-optic signal conversion effected thereby converts the audio voice signals into color picture signals so that, based on the high information processing capacity of the human eye, a large amount of voice information is brought to the eye and the eye is capable not only of receiving spatially separated images but also of distinguishing various color hues.

Apparatus for practicing the invention achieves a particularly advantageous acoustic-optic signal conversion in that a certain hue is associated with every audio frequency range and thus a precisely defined color mixture is associated with every acoustic spectral pattern.

It is of particular advantage to the objects of the invention to construct the filters employed as a three-channel triangular filter.

DESCRIPTION OF THE PREFERRED EMBODIMENTS

The method of converting acoustic signals into optical signals in order to help hearing impaired or deaf persons to communicate, is of particular advantage because the eye is capable of processing an information quantity corresponding to $10^6$ bits per second while the ear can only process an information quantity corresponding to $3.5 \times 10^4$ bits per second. Consequently, the eye is capable of receiving an information quantity per second which is about thirty times greater than that received by the ear.

It is not absolutely necessary that all of the acoustic information impinging in the ear of a hearing impaired person be transmitted, because an articulate person is capable of producing only an information quantity corresponding to $10^3$ bits per second.

The information quantity which must be processed therefore, is only about one thousandth of the information quantity which the eye can process.

Moreover, hearing and sight differ in their time and space resolution capabilities. The ear has a high time resolution while its spatial resolution capability is rather weak. The eye, however, has a poor time resolution capability whereas it is capable of simultaneously detecting many details of spatially spread-out images.

For the above reasons, two considerations must preferably be taken into account for any acoustic-optic signal conversion. If, on the one hand, the eye is to analyze acoustical processes, these processes, which occur in rapid succession in time, must be displayed spatially in juxtaposition. For such spatial arrangement of successive processes, image storage and preferably electronic image storage, is of particular advantage. On the other hand, the high processing capacity of the eye is due not only to the fact that it is capable of detecting spatially divergent images but also that it is capable of distinguishing very many color hues. Consequently, if as much speech information as possible is to be detected by the eye, such speech information in the form of audio signals must be converted into color picture, or image, signals.

Based on these considerations, the present invention provides a basic method in which a certain color hue is assigned to every audio frequency and each acoustic spectrum is given a precisely defined color mixture.

Figure 1:
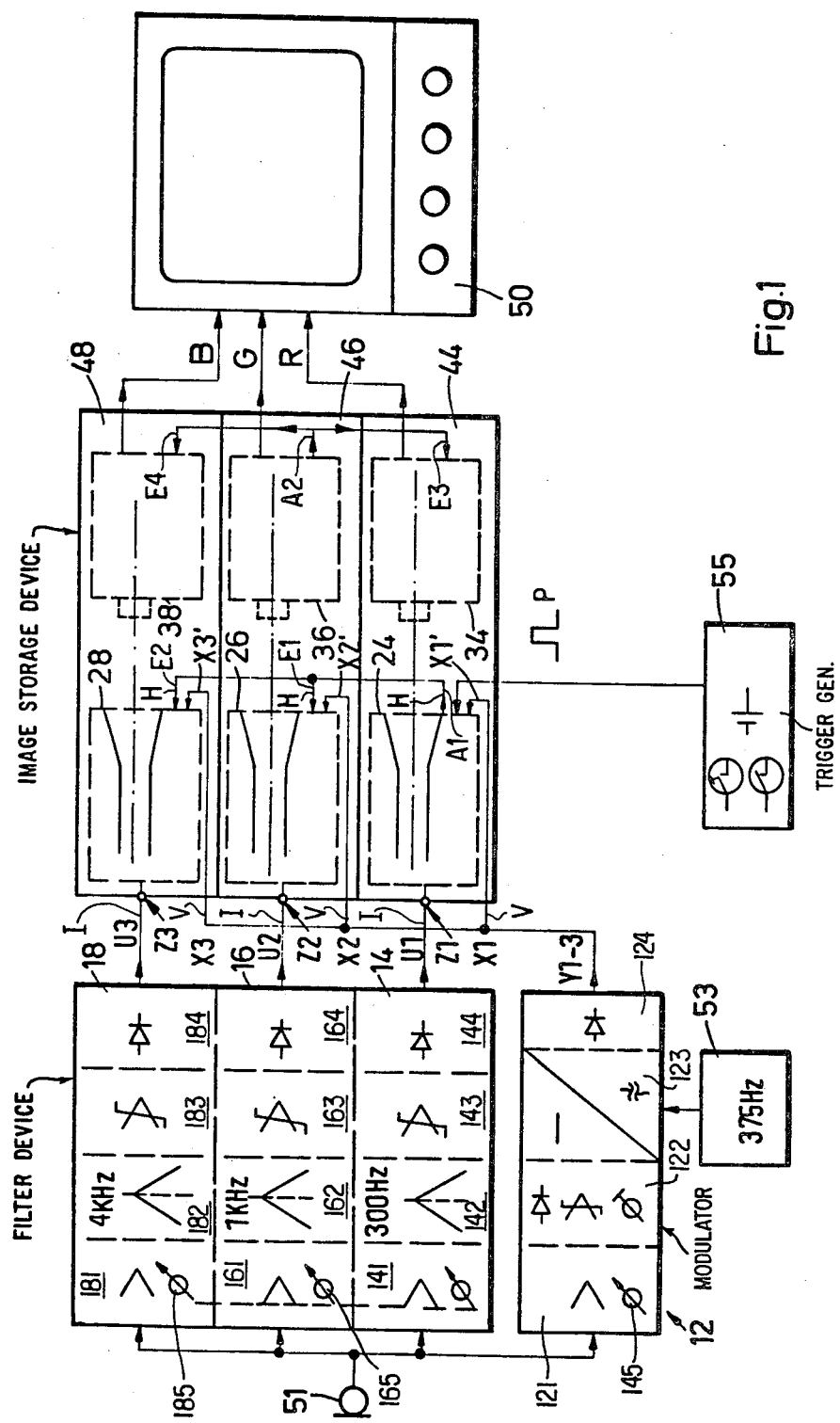
FIG. 1 is a block circuit diagram of a preferred embodiment of an apparatus for the acoustic-optic signal conversion according to the invention.

FIG. 1 is a block circuit diagram of an apparatus for the acoustic-optic conversion of signals, including a microphone 51 which furnishes an acoustic input signal to be processed. That signal is fed in parallel to the inputs of a filter device 14, 16, 18 and to a signal input of a modulator device 12. The filter device is a three-channel filter each channel 14, 16, 18 of which includes, as depicted, an adjustable amplifier, a filter proper having a triangular frequency response, an amplitude limiter and a rectifier. Modulator device 12 similarly includes an adjustable amplifier, an adjustable limiter and rectifier stage, a modulating stage, and a final rectifier stage. In the modulator device 12, the input signal from microphone 51 is modulated onto a carrier of 375 Hz furnished by an oscillator 53 and the modulated signal is rectified. Consequently, the output of the modulator device 12 emits a rectified signal Y1-3 whose amplitude at every point in time corresponds to the audio level of the input signal. This rectified signal is furnished to first inputs X1, X2, and X3 of respective image storage units 44, 46 and 48. Second inputs Z1, Z2, and Z3 of the respective image storage units receive the likewise rectified output signals from respective filter device channels 14, 16 and 18. The resulting output signals R, G, B from the respective image storage units 44, 46 and 48 are switched to respective ones of the three color guns of a color monitor 50 and control the intensities of the electron beams produced by the color guns of this color monitor.

The type of the specific components of filter devices 14, 16, 18 and modulator 12 are as follow: The adjustable amplifiers 141, 161, 181 are low-frequency preamplifiers with volume compression (compression rate 2,5:1). Control elements 145, 165, 185 serve for simultaneous adjustment of the gain of the amplifiers 141, 161, 181.

The filters 142, 162, 182 are LC-filters with triangular frequency response the resonance frequencies of which are 300 Hz, 1000 Hz and 4000 Hz. The steepness of these filters should be 20 dB/octave. The amplitude limiters 143, 163, 183 are output amplifiers with a constant gain.

The diodes 144, 164, 184 are usual semiconductor diodes each followed by a filter section.

Modulator device 12 comprises a low-frequency preamplifer 121 of the same kind as the preamplifiers 145, 165, 185 mentioned above.

The adjustable limiter and rectifier stage 122 acts as an impedance transformer and supplies a direct voltage the amplitude of which depends on the signal strength of the input speech signal. Modulating stage 123 includes an amplitude-modulation ring modulator. The carrier frequency of 375 Hz is used to avoid beat which will otherwise occur because of the double line-frequency. The purpose of the carrier frequency is to produce colour surfaces on the screen of monitor 50 as a function of the speech frequencies. The modulating stage 123 is followed by the rectifier 124 i.e. a semi-conductor diode.

Figure 2:
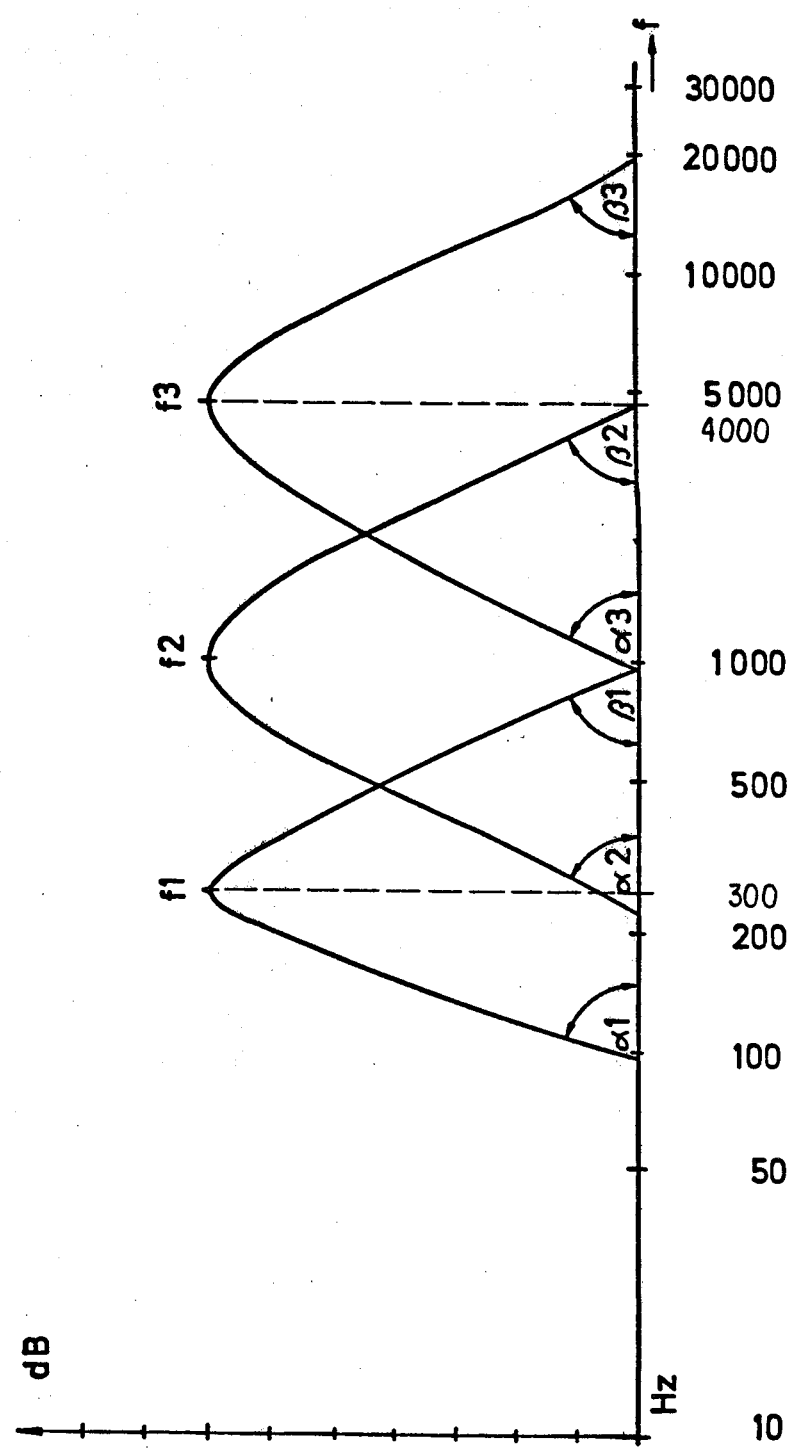
FIG. 2 is a signal diagram illustrating the response of a three-channel triangular filter used in an apparatus according to the invention.

The heart of this sound-color picture transformation system is the filter device including three parallel connected bandpass filters whose transmission characteristics are triangular. These characteristics are depicted in FIG. 2. The triangles here advantageously overlap in such a manner that in the total frequency range covered by the three bandpass filters, each acoustic frequency fx has associated with it a characteristic ratio of the amplitudes of the output voltages U1, U2, U3 of the three rectified output signals from the filter channels, so that the following applies:

$$f_x \triangleq U1:U2:U3.$$

As the end result, these three voltages control the three color guns of the color monitor, if the preferred electronic image storage is employed with corresponding analog/digital-digital/analog conversion so that each one of the acoustic frequencies in the frequency range is unequivocally associated with a color hue.

The characteristic of each filter is determined by the center frequency, f, the slope, $\alpha$, of the low frequency side of its pass band and the slope, $\beta$, of the high frequency side of its pass band, and in order to determine the optimum setting of the filter parameters f1, f2, f3 $\alpha$1, $\alpha$2, $\alpha$3 and $\beta$1, $\beta$2 and $\beta$3, real time frequency analyses are advantageously performed of the vowels, modified vowels and consonants, and their various combinations for the language with which the system is to be used. These analyses should be prepared from the speech of different normal speakers and a plurality of hearing impaired persons. From the thus-determined data material, the above-mentioned filter parameters must be selected in such a manner that the differences between normal speech and the speech of hearing impaired or deaf persons becomes clearly and spontaneously discernible. The filter parameters are the three center frequencies and the six slope angles.

In FIG. 1, the electronic image storage system is composed of three image storage units 44, 46 and 48 constituted basically by microprocessors but replaced here, as a substitute for image storage, with commercially available instruments in order to facilitate understanding of the operating principles of the apparatus. Accordingly, each one of the three-channel filter devices 14, 16 and 18 is connected in series with a cathode-ray device 24, 25 or 28 equipped with a phosphorescent screen. The first inputs X1', X2' and X3' of these cathode-ray devices receive the rectified signal Y1-3 and their second inputs Z1, Z2, Z3 receive the rectified output signals of the corresponding series-connected filter devices in order to modulate the intensity of the images recorded on their screens. The cathode-ray devices 24, 26 and 28 are here triggered by a pulse generator 55 in that one cathode-ray device is triggered directly by a generator 55 and that device, then itself triggers the other two cathode-ray devices for purposes of synchronization. Recording devices 34, 36 and 38, for example television cameras, are then disposed in front of the phosphorescent screens of the cathode-ray devices. These recording devices control the respective color guns of the connected color monitor device 50. The picture quality to be attained constitutes a good compromise in which brightness control is no problem if cathode-ray devices are used which have a large dynamic brightness range. The commercially available instruments for image storage are shown in broken lines.

Further features of the above mentioned image storage device and monitor device 50 (FIG. 1) are as follows.

The shape of the waveform of voltages $U_1$, $U_2$, $U_3$ depends on the frequency of the input voltage and on the adjustment of control elements 145, 165, 185. As mentioned above the cathode-ray devices 24, 26, 28 are commercially available instruments, for example oscillographs of the type HAMEG HM 312, X1', X2', X3' are the inputs for vertical sweep signals of the oscillographs and inputs Z1, Z2, Z3 control the acceleration of the cathode-rays, that means the brightness of image.

An output A1 of device 24 delivers a saw-tooth voltage which acts as a signal voltage for horizontal sweep which is led to the inputs E1 and E2 of the devices 26, 28. The horizontal deflection of the scanning beam of cameras 34, 36, 38 is 625 lines per picture and there will be 50 fields per second. Camera 36 has an output A2 which delivers synchronizing pulses to the inputs E3, E4 of cameras 34, 38. For this reason the three cameras are synchronized. The monitor 50 has the same deflection pattern and scanning as the camera 34, 36, 38. Generator 55 serves only for producing a trigger pulse P for triggering the oscillographs before one speaks into the microphone 51. As confirmed by experiments the equipment shown in FIG. 1 and described above works without any objection in a frequency range between 300 and 4000 Hz.

Even though the individual components are shown as individual blocks in the block circuit diagram of FIG. 1, the device for the acoustic-optic signal conversion can nevertheless be produced as an integrated instrument in which the electronic system and the monitor screen are contained in one housing. Miniaturization of the entire system is possible in such a way that the instrument can be carried and the image signals can be reflected into specially designed spectacles by means of glass fiber optics.

Further advantages of the sound-color picture transformation of acoustic signals are that, independent of the speaker, the respective words can be recognized from the color pictures. Moreover, with some practice, voice particularities of the individual speakers can also be read from the pictures. When the sound-color picture transformation system is used, the clearly distinguishable differences between the pictures from normal speakers and from those with impaired hearing enable the hearing impaired to quickly correct articulation errors.

It will be understood that the above description of the present invention is susceptible to various modifications, changes and adaptations, and the same are intended to be comprehended within the meaning and range of equivalents of the appended claims.

What is claimed is:

1. In apparatus for converting acoustic signals into visual signals and including a plurality of parallel connected frequency filters connected to receive the acoustic signals and divide them into selected frequency bands, and a cathode-ray tube having a luminescent screen on which the divided acoustic signals are made visible by controlling the brightness of the cathode-ray beam as a function of the intensity of the signals from the filters, the improvement wherein there are three said filters each of which is a bandpass filter having a triangular amplitude versus frequency transmission characteristic and said filters comprise a three-channel filter device each channel of which has a pass-band extending over a respectively different frequency range such that the frequency ranges of adjacent pass-bands partially overlap one another, and each channel of which is provided with a respective output for providing a rectified signal, and said apparatus further comprises: a modulator device connected to furnish a rectified signal having an amplitude which corresponds, at every point in time, to the audio level of the acoustic signals applied to said filters; an image storage device presenting three image storage channels each having a first input, a second input and an output providing a signal representative of the signals at its inputs, the first input of each said storage channel being connected to receive the rectified signal furnished by said modulator device and the second input of each said storage channel being connected to the output of a respective filter device channel; and a color television monitor including a cathode-ray tube having three color signal inputs each connected to be controlled by the signal at the output of a respective storage channel.

2. Apparatus as defined in claim 1 wherein the transmission characteristics of said three parallel-connected bandpass filters are such that each acoustic frequency in the range covered by the pass-bands of said filter device corresponds to a characteristic ratio of the three voltages of the rectified signals at the outputs of said filter device channels.

3. Apparatus as defined in claim 1, or 2 wherein each said image storage channel comprises a cathode ray tube having a luminescent screen and connected to cause the brightness of the image on its screen to be modulated by the signals at said second input of said channel, and a recording device arranged to record the image on said screen and to provide a signal representative thereof at said output of said channel.

4. Apparatus as defined in claim 3 wherein said image storage device is an electronic system.

5. Apparatus as defined in claim 1, or 2 wherein said image storage device is an electronic system.

6. Apparatus as defined in claim 5 wherein said electronic system is a microprocessor.

* * * * *